No. 743,683. PATENTED NOV. 10, 1903.
C. C. BRABANT.
BEET ROOT CUTTER.
APPLICATION FILED MAR. 7, 1903.
NO MODEL.
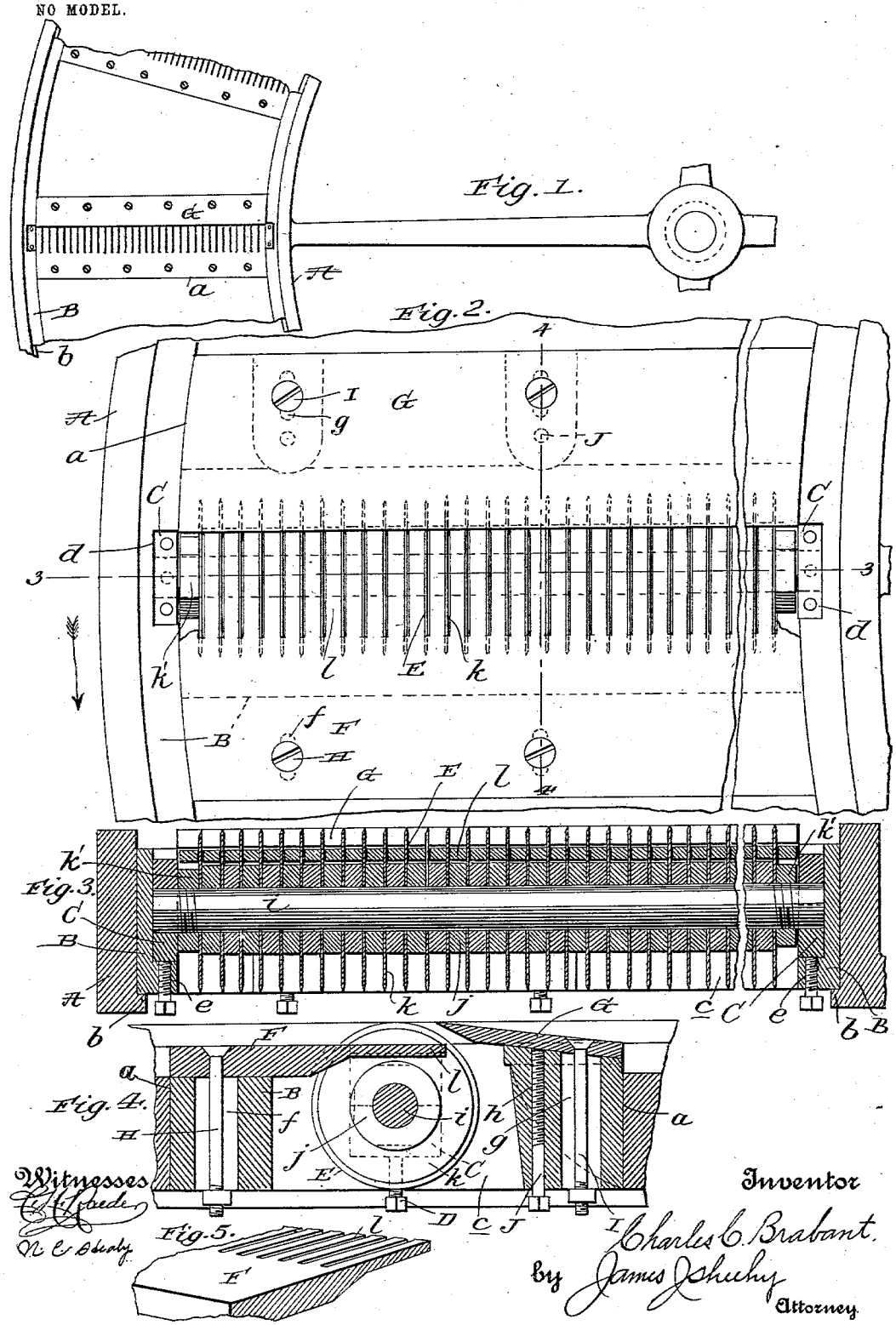

No. 743,683.

Patented November 10, 1903.

UNITED STATES PATENT OFFICE.

CHARLES C. BRABANT, OF ALPENA, MICHIGAN.

BEET-ROOT CUTTER.

SPECIFICATION forming part of Letters Patent No. 743,683, dated November 10, 1903.

Application filed March 7, 1903. Serial No. 146,709. (No model.)

*To all whom it may concern:*

Be it known that I, CHARLES C. BRABANT, a citizen of the United States, residing at Alpena, in the county of Alpena and State of Michigan, have invented new and useful Improvements in Beet-Root Cutters, of which the following is a specification.

My invention relates to machines for cutting beet-roots, and more particularly to the rotary cutters thereof; and it has for its object to provide a highly-efficient cutter of such construction that it is not liable to be materially impaired by stones, pieces of iron, or other foreign articles fed to the machine with the beet-roots and one the parts of which are adapted to be adjusted so as to reduce the beet-roots to pieces of the size desired.

With the foregoing in mind the invention will be fully understood from the following description and claims when taken in connection with the accompanying drawings, in which—

Figure 1 is a plan view of so much of a rotary beet-root cutter as is necessary to illustrate my invention; Fig. 2, an enlarged detail broken plan of the annular frame of the cutter; Figs. 3 and 4, sections taken in the planes indicated by the broken lines 3 3 and 4 4, respectively, of Fig. 2; and Fig. 5, a sectional perspective view of a portion of one of the finger-plates comprised in my improvements.

Similar letters of reference designate corresponding parts in all of the several views of the drawings, referring to which—

A is the annular frame of my improved cutter, which has openings $a$ and flanges $b$ on the inner and outer circular walls of said openings, and B B are knife-bodies, preferably of steel, occupying the openings $a$ and resting on the flanges $b$ of said frame. The several bodies B and their appurtenances are similar in construction, and therefore a detailed description of the one shown in Figs. 2, 3, and 4 will suffice to impart an understanding of all. Said body in the preferred embodiment of my invention is provided with a vertical opening $c$, Fig. 4, seats $d$ in the inner and outer walls of said opening, Figs. 2 and 3, screw-tapped apertures $e$ in the bottom walls of said seats, vertically-disposed slots $fg$, and vertically-disposed screw-tapped apertures $h$, and it carries gearing-blocks C, disposed in the seats $d$, adjusting-screws D, bearing in the apertures $e$ and engaging the lower ends of the blocks C, a rotatable knife E, arranged in the opening $c$ and having journals at its ends bearing in the blocks C, a finger-plate F, a fixed knife G, bolts H, disposed in the slots $f$ and having nuts at their lower ends, bolts I, disposed in the slots $g$ and also having nuts at their lower ends, and screws J, bearing in the apertures $h$ and engaging the under side of the knife G. The rotatable knife E preferably comprises a shaft $i$, a plurality of spacing-washers $j$, a plurality of disk-like blades $k$, arranged on the shaft between the washers, and nuts $k'$, arranged on the threaded portions adjacent to the ends of the shaft and having for their purpose to hold the washers and blades in proper position on the shaft. The plate F is connected to the body B, so that its fingers $l$ rest between the blades of the rotatable knife, as best shown in Figs. 3 and 4, while the knife G is connected to the body at the opposite side of the rotatable knife with reference to the finger-plate and so that its cutting edge rests above the ends of the fingers $l$ and adjacent to the edges of the blades $k$ of the rotatable knife.

In the practical operation of my improvements the cutter is rotated in the direction indicated by arrow, Fig. 2, and the beet-roots are fed to the same in the ordinary or any other approved manner. When the machine is thus operated, it will be observed that the disk-like blades of the rotatable knives will cut the beet-roots into strips, while the knives G, following the rotatable knives, will shave such strips from the roots without breaking them up; also, that the ends of the fingers of the plates F serve in conjunction with the knives G, the edges of which rest above the ends of the fingers, and the blades of the rotatable knives E to form square passages calculated to keep the pulp on its course and prevent mashing and breaking of the same, as is done by the old corrugated knives. It will further be observed that by adjusting the finger-plates F and knives G and using washers of different thicknesses between the disk-like blades of the rotatable knives the size of the pieces into which the roots are cut may be readily regulated.

Incident to the operation of the machine the knives E are rotated when their blades engage the beets, and hence it will be observed that in the event of the blades of any of said knives engaging a stone, piece of iron, or other foreign article that may be among the beets such article will ride easily over the blades and the following knife G without seriously injuring either. This will be appreciated as an important advantage when it is remembered that foreign articles are frequently fed to beet-root cutters among the roots and result in the knives, especially the well-known corrugated knives, being so badly damaged as to necessitate stopping the cutter and replacing the injured knife with a new one.

The fingers of the plate F rest over the washers of the rotatable knife, and hence said knife is not liable to be casually displaced. When, however, the plate F is removed, the rotatable knife may be readily lifted from the body B.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention as claimed.

Having described my invention, what I claim, and desire to secure by Letters Patent, is—

1. In a beet-root cutter, the combination of a body, a knife rotatable on its axis in said body, and having disk-like blades at intervals in its length, a plate carried by the body, and having fingers interposed between the blades of the rotatable knife, and a fixed knife also carried by the body, and arranged at the opposite side of the rotatable knife, with reference to the finger-plate, with its edge above the ends of the fingers, whereby passages are formed between the disk-like blades of the rotatable knife, the ends of the fingers, and the edge of the fixed knife.

2. In a beet-root cutter, the combination of a body provided with seats, open at their upper ends, bearing-blocks removably arranged in said seats, a rotatable knife having disk-like blades, at intervals in its length, and also having journals, at its ends, arranged in the bearing-blocks, a plate detachably connected with the frame, and having fingers interposed between the blades of the rotatable knife, and resting above the portions of the rotatable knife between the blades thereof, and a knife arranged at the opposite side of the rotatable knife, with reference to the finger-plate, and connected to the body.

3. In a beet-root cutter, the combination of a frame, a body or knife-holder arranged therein, and having a central opening, and seats in opposite walls of said opening, open at their upper ends, bearing-blocks arranged in said seats, screws bearing in the bottom walls of the seats, and engaging the bearing-blocks, a rotatable knife arranged in the said opening of the body, and having disk-like blades at intervals of its length, and journals, at its ends, arranged in the bearing-blocks, a plate adjustably connected to the body, at one side of the rotatable knife, and having fingers resting above the portions of the rotatable knife between the blades thereof, a knife adjustably connected to the body, and arranged at the opposite side of the rotatable knife, with its cutting edge above the ends of the fingers, whereby passages are formed between the ends of the fingers, the disk-like blades of the rotatable knife and the edge of the other knife, and an adjusting screw or screws bearing in the body, and engaging the under side of the latter knife.

In testimony whereof I have hereunto set my hand in presence of two subscribing witnesses.

CHARLES C. BRABANT.

Witnesses:
O. W. KUNNA,
BYRON H. OLDS.